(12) United States Patent
Ersoy

(10) Patent No.: US 8,616,799 B2
(45) Date of Patent: Dec. 31, 2013

(54) BALL AND SOCKET JOINT FOR A VEHICLE

(75) Inventor: Metin Ersoy, Walluf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 58 days.

(21) Appl. No.: 13/459,299

(22) Filed: Apr. 30, 2012

(65) Prior Publication Data

US 2012/0282014 A1  Nov. 8, 2012

(30) Foreign Application Priority Data

May 5, 2011 (DE) .......................... 10 2011 075 323

(51) Int. Cl.
  *F16C 11/06* (2006.01)
(52) U.S. Cl.
  USPC .......................................... 403/137; 403/147
(58) Field of Classification Search
  USPC ............................ 403/122, 135–138, 144–148
  See application file for complete search history.

(56) References Cited

U.S. PATENT DOCUMENTS

| | | | | |
|---|---|---|---|---|
| 2,065,589 A | * | 12/1936 | Hufferd | 403/127 |
| 2,074,748 A | * | 3/1937 | Hufferd et al. | 403/127 |
| 2,122,655 A | * | 7/1938 | Niles | 403/127 |
| 2,242,303 A | * | 5/1941 | Irmischer | 285/282 |
| 2,388,950 A | * | 11/1945 | Booth | 403/127 |
| 2,396,137 A | * | 3/1946 | Venditty et al. | 403/127 |
| 2,544,583 A | * | 3/1951 | Booth | 403/127 |
| 2,797,930 A | * | 7/1957 | Booth | 280/124.134 |
| 2,873,130 A | * | 2/1959 | Moskovitz | 403/127 |
| 3,389,928 A | | 6/1968 | Wehner | |
| 3,909,084 A | * | 9/1975 | Snidar et al. | 384/203 |
| 4,986,689 A | * | 1/1991 | Drutchas | 403/127 |
| 2012/0282015 A1 | * | 11/2012 | Ersoy et al. | 403/133 |

FOREIGN PATENT DOCUMENTS

| | | |
|---|---|---|
| CH | 303377 A | 11/1954 |
| DE | 1 450 064 | 4/1969 |
| DE | 102 45 983 A1 | 4/2004 |
| GB | 992 100 | 5/1965 |

\* cited by examiner

*Primary Examiner* — Michael P Ferguson
*Assistant Examiner* — Matthieu Setliff
(74) *Attorney, Agent, or Firm* — Davis & Bujold, PLLC; Michael J. Bujold

(57) ABSTRACT

A ball and socket joint which comprises a joint ball which is enclosed and rotationally supported by a ball socket. The ball socket has two socket parts that move axially relative to one another, and the socket parts act on opposite sides of the joint ball in the axial direction. An adjusting device has a transmission and drive by which the socket parts can be moved toward one another in the axial direction and exert pressure on the joint ball. The transmission comprises a first part which has tracks that rise in the axial direction and curve around a rotational axis oriented in the axial direction and in which a ball is guided. A second part, which contacts the balls, is disposed between the transmission parts in the axial direction. The balls and the first part can be rotated relative to one another about the rotational axis by the drive.

11 Claims, 2 Drawing Sheets

BALL AND SOCKET JOINT FOR A VEHICLE

This application claims priority from German patent application serial no. 10 2011 075 323.0 filed May 5, 2011.

FIELD OF THE INVENTION

The invention relates to a ball and socket joint for a vehicle, comprising a ball pin, which comprises a joint ball, a ball socket, which encloses the joint ball and is provided with a pin opening and in which the joint ball of the ball pin is rotatably supported, the ball pin extending out of the ball socket through the pin opening, the ball socket comprising two ball socket parts that can be moved relative to each other in an axial direction, the ball socket parts acting on different sides of the joint ball that are opposite each other in the axial direction, and an adjusting device, which is provided with a transmission and a drive and by means of which the ball socket parts can be moved toward each other in the axial direction so that the ball socket parts can exert pressure on the joint ball.

BACKGROUND OF THE INVENTION

Conventional standard-production ball and socket joints have two substantial disadvantages. First, the torques are impermissibly dispersed as a result of production despite annealing. Second, a more or less severe wear, which can greatly impair the driving properties of older vehicles and even cause failures, arises with increasing duration of operation. Simple measures for pre-loading, such as installing a rubber ring or a compression spring as a pre-loading element, have not proven themselves, because the pre-loading elements used yield under axial loads and are likely to cause play.

DE 1 450 064 A discloses a self-adjusting ball and socket joint, comprising a housing that has a socket part, which is provided with a ball-pin-head bearing seat, a ball pin having a ball head, which rests against the seat and the shaft of which extends out of the socket part, wherein a wall of the socket part is located at a distance from the ball head and is disposed on the side of the ball head opposite the seat, a self-exciting spindle drive device, which is disposed between the ball head and the wall in order to continuously load the head against the seat and which has a nut provided with an internal thread, the nut being screwed to a spindle provided with an external thread, and a spiral torsion spring, which is wrapped around the outside of the nut and which is connected to the nut at the inner end of the torsion spring, while the outer end of the torsion spring is connected to the spindle at a distance radially outward from the nut, wherein the torsional stress of the spring acts in a direction so as to unscrew the nut and the spindle in order to extend the spindle drive device. A flat thread or trapezoidal thread, for example, is used as the thread. A similar ball and socket joint is also known from GB 992 100 A.

In this ball and socket joint, the spindle is screwed into the nut so that the transmission formed by the spindle drive device is built relatively large in the axial direction. Furthermore, the friction between the spindle and the nut is relatively large for the threads used, which must be taken into account in the design of the spring.

SUMMARY OF THE INVENTION

Proceeding therefrom, the problem to be solved by the invention is that of increasing the efficiency of the adjusting device relative to the aforementioned spindle drive device for a ball and socket joint of the initially described type.

This problem is solved using a ball and socket joint according to the invention.

The ball and socket joint according to the invention for a vehicle, in particular a motor vehicle, comprises a ball pin, which comprises a joint ball, a ball socket, which encloses the joint ball and is provided with a pin opening and in which the joint ball of the ball pin is rotatably supported, the ball pin extending out of the ball socket through the pin opening, the ball socket comprising two ball socket parts that can be moved relative to each other in an axial direction, the ball socket parts acting on different sides of the joint ball that are opposite each other in the axial direction, and an adjusting device, which is provided with a transmission and a drive and by means of which the ball socket parts can be moved toward each other in the axial direction so that the ball socket parts can exert a pressure on the joint ball, wherein the transmission comprises a first transmission part having ball tracks, which rise in the axial direction and extend curved around a rotational axis oriented in the axial direction and in each of which a transmission ball is movably guided, and a second transmission part, which is in contact with the transmission balls, which are disposed between the transmission parts in the axial direction, and wherein the transmission balls and the first transmission part can be rotated relative to each other about the rotational axis by means of the drive.

For the ball and socket joint according to the invention, the friction that occurs in the transmission is relatively low, so that a relatively high efficiency of the adjusting device can be achieved. Furthermore, the adjusting device forms a stroke device, which can be driven by the drive and by means of which the ball socket parts can be moved toward each other in the axial direction. The stroke of the adjusting device causing the pressure on the joint ball is achieved by means of the ball tracks that rise in the axial direction. The transmission can be designed to be very compact. In particular, the transmission can be constructed flatter than the conventional spindle drive device.

Preferably a longitudinal axis that extends in the axial direction and that passes through the center point of the joint ball is associated with the ball joint. This longitudinal axis is also referred to as the center longitudinal axis in particular. Advantageously, the rotational axis is formed by the longitudinal axis or coincides with the longitudinal axis. The ball tracks of the first transmission part preferably each extend along a spiral that extends around the rotational axis. In particular, the ball tracks of the first transmission part extend around the rotational axis in a spiral shape. Advantageously, the ball tracks of the first transmission part are offset from each other around the rotational axis. The ball tracks of the first transmission part are preferably designed as grooves introduced into the first transmission part.

A first ball socket part of the ball socket parts interacts in particular with the first transmission part or forms the first transmission part. The interaction can occur, for example, in that the first transmission part presses against the first ball socket part. The first transmission part preferably acts directly or indirectly on the first ball socket part. Furthermore, the second ball socket part interacts in particular with the second transmission part or forms the second transmission part. The interaction can occur, for example, in that the second transmission part presses against the second ball socket part. The second transmission part preferably acts directly or indirectly on the second ball socket part. Advantageously, the ball socket parts are pressed toward each other in the axial direction by means of the adjusting device, so that the ball socket parts exert a pressure on the joint ball.

The two ball socket parts can be disposed in a ball and socket joint housing. However, one of the ball socket parts preferably forms a housing, in which the joint ball and the other ball socket part are disposed. Advantageously, the transmission and/or the drive are also disposed in the housing. A particularly compact construction of the ball and socket joint thus results. An interior, in which the joint ball is disposed, is preferably provided in the housing. In particular, the other ball socket part is also disposed in the interior and is movably guided in the interior in the axial direction. The housing preferably has a circumferential wall, which bounds the interior. The other ball socket part can therefore be considered a piston, which is movably guided in the axial direction in the housing, which forms a cylinder in this sense. The interior preferably comprises a cylindrical inner circumferential surface, on which in particular the other ball socket part is movably guided in the axial direction at the outer circumferential surface of the ball socket part. The inner circumferential surface is preferably formed by the wall of the housing. Furthermore, the outer circumferential surface of the other ball socket part is cylindrical in particular. The housing is preferably formed by the second ball socket part, so that the other ball socket part is formed in particular by the first ball socket part. The first ball socket part is preferably annular.

According to a development of the invention, the first ball socket part can be moved relative to the second ball socket part in the axial direction by means of the adjusting device. Thus the pressure which the ball socket parts exert on the joint ball and which determines in particular the friction of the joint ball can be set by means of the adjusting device. The pressure exerted by the ball socket parts on the joint ball can, for example, be varied by means of the adjusting device and/or be maintained as the ball and socket joint becomes worn. The ball socket parts are preferably made of metal, in particular steel.

The points at which the second transmission part is in contact with the transmission balls preferably lie in a plane extending perpendicularly to the axial direction. According to a development of the invention, the second transmission part is provided with ball tracks, in which the transmission balls are guided. These ball tracks preferably face the ball tracks of the first transmission part, wherein pairs of ball tracks facing each other form ball track pairs. Thus the transmission balls are guided in the ball track pairs and in particular enclosed by the ball track pairs. The ball tracks of the second transmission part lie, for example, in a plane extending perpendicularly to the axial direction or are inclined in the axial direction. The ball tracks of the second transmission part preferably extend in the radial direction. The radial direction is in particular a direction or an arbitrary direction that extends perpendicularly to the axial direction and/or perpendicularly to the rotational axis. Advantageously, the ball tracks of the second transmission part are offset from each other around the rotational axis. The ball tracks of the second transmission part are preferably designed as grooves introduced into the second transmission part. The transmission parts are preferably made of metal, in particular steel. Furthermore, the transmission balls are preferably made of metal, in particular steel. The first transmission part is preferably annular. Furthermore, the second transmission part is preferably annular. Advantageously, the transmission parts can be rotated relative to each other about the rotational axis, in particular by means of the drive. Alternatively to a radial course, the ball tracks of the second transmission part can also be curved around the rotational axis. In this case, the ball tracks of the second transmission part each extend, for example, along a spiral that extends around the rotational axis. In particular, the ball tracks of the second transmission part extend around the rotational axis in a spiral shape in this case.

According to a development of the invention, radially extending guides are provided, in which the transmission balls are each movably guided in a radial direction. Advantageously, the guides and the first transmission part can be rotated relative to each other about the rotational axis by means of the drive. The guides can be provided on the second transmission part and are formed, for example, by the ball tracks of the second transmission part. Alternatively, a ball guiding element having radially extending slits, in which the transmission balls are movably guided, in particular in the radial direction, can be disposed between the transmission parts. In this case, the radially extending guides are preferably formed by the slits. The ball guiding element can be designed in the shape of a star wheel, for example. For example, the ball guiding element is connected to the second transmission part in a rigid or rotationally rigid manner. However, the ball guiding element can also be rotatable relative to the transmission parts about the rotational axis as an alternative. The ball guiding element is preferably made of metal, in particular steel. If the ball guiding element is present, the ball tracks of the second transmission part can also be omitted, so that the face of the second transmission part that faces the first transmission part and against which the transmission balls rest is flat, for example. But this should not be considered restrictive, so that the ball tracks of the second transmission part can be present despite the ball guiding element.

The ball guiding element can be rotated, for example, relative to the first transmission part about the rotational axis by means of the drive. By rotation of the ball guiding element about the rotational axis, the transmission balls are guided along the ball tracks, wherein the axial distance between the transmission parts is changed, in particular increased, as a result of the ball tracks rising in the axial direction. Because the ball tracks are curved around the rotational axis, in particular the distance of the transmission balls from the rotational axis also changes. However, the first transmission part preferably can be rotated about the rotational axis, in particular relative to the transmission balls and/or the second transmission part, by means of the drive. While the first transmission part is rotated, the transmission balls run along the ball tracks, wherein the axial distance between the transmission parts is changed, in particular increased, as a result of the ball tracks rising in the axial direction. Because the ball tracks are curved around the rotational axis, in particular the distance of the transmission balls from the rotational axis also changes.

According to a development of the invention, the first transmission part can be rotated about the rotational axis relative to the first ball socket part by means of the drive. The first transmission part is preferably coupled to the first ball socket part, bearing balls being disposed therebetween, wherein the bearing balls are disposed between the first transmission part and the first ball socket part in the axial direction. The friction between the first transmission part and the first ball socket part can thereby be kept low. The first transmission part, the bearing balls, and the first ball socket part form an axial ball bearing in this sense. A groove in which the bearing balls are guided is advantageously provided on the face of the first transmission part facing the first ball socket part. The groove extends in particular around the rotational axis and is preferably annular. Furthermore, a groove in which the bearing balls are guided can be provided on the side of the first ball socket part facing the first transmission part. This groove runs in particular around the rotational axis and is preferably annular. In particular, the two grooves form a groove pair, in which the bearing balls are guided and which in particular encloses the bearing balls. The bearing balls are preferably made of metal, in particular steel.

A torque in particular can be applied by means of the drive, preferably to the first transmission part. If the ball guiding element is present, the torque can also be applied to the ball guiding element. The drive is preferably designed as a rotary drive. Because the stroke of the adjusting device is based on a rotational motion, there is no need for translational motion to be converted into rotational motion for rotary drive.

The drive can be a hydraulic or electric drive. In this case, the drive is connected in particular to a control device and can be controlled by means of the control device. The ball and socket joint can comprise the control device. However, the control device can also be provided outside of the ball and socket joint. In particular, the pressure exerted on the joint ball can be controlled by means of the control device. However, the drive preferably comprises a driving spring or is designed as such. In this case, the pressure exerted on the joint ball can be held constant, nearly constant, or at least within a specified range, in particular over the service life of the ball and socket joint, by means of the drive and/or the adjusting device. Thus play that occurs due to wear can be compensated for. The driving spring is pre-loaded in particular. A torque preferably can be applied, preferably to the first transmission part, by means of the driving spring. If the ball guiding element is present, the torque can also be applied to the ball guiding element. The driving spring is preferably designed as a spiral spring, a torsion spring, a torsion bar, or another torsional spring. A spiral spring offers the advantage that the spiral spring is built relatively flat compared to other springs and thus is well suited for integration into a ball and socket joint.

According to a development of the invention, the driving spring is coupled to the first transmission part at a first end and to the second transmission part at a second end. The coupling can occur either directly or indirectly. If the ball guiding element is present, the second of the driving spring can also be coupled to the ball guiding element. The spring axis of the driving spring coincides in particular with the rotational axis. The driving spring is preferably disposed concentric to the transmission parts.

If the driving spring is a spiral spring, the radially outer end thereof is preferably connected to the first transmission part, wherein the radially inner end of the spiral spring is preferably connected to the second transmission part and/or to a spring retainer. The spiral spring is preferably pushed onto the spring retainer axially. In particular, the spring retainer is rigidly connected to the second transmission part or formed by the second transmission part. The pre-load of the driving spring advantageously can be set by means of the spring retainer. The spring retainer is preferably designed as a screw that is screwed into the second transmission part and/or into the second ball socket part. This offers the advantage that the pre-load of the spiral spring can be set by rotating the screw. Thus the screw can also be referred to as a pre-loading screw or adjusting screw. In particular, a slit in which the radially inner end of the spiral spring engages is provided in the spring retainer. Furthermore, a slit in which the radially outer end of the spiral spring engages is preferably provided on the first transmission part.

According to a development of the invention, the joint ball is supported in the ball socket, a bearing shell being disposed therebetween. The bearing shell can be designed as a one-piece or multi-piece bearing shell. In particular, the bearing shell encloses the joint ball, which is supported in the bearing shell in a movable, in particular rotatable and/or pivotable, manner. The bearing shell is preferably made of a pliable, in particular elastic material, so that the pressure exerted on the bearing shell by the ball socket parts can be transferred to the joint ball even for a one-piece bearing shell. The bearing shell forms a ball shell in particular. The bearing shell is preferably made of plastic.

According to a development of the invention, the ball socket parts are each provided with a conical region on the side of the ball socket part facing the joint ball. Furthermore, the bearing shell is preferably provided with conical regions on the sides of the bearing shell facing the ball socket parts, the conical regions being supported on the conical regions of the ball socket parts and/or being brought into contact with the conical regions of the ball socket parts. Test results have indicated that the torque of the ball pin is proportional to the axial force with which the ball socket parts press against the bearing shell.

The axial force with which the ball socket parts press against the bearing shell is applied by the adjusting device. In particular, the friction acting on the joint ball increases with increasing spring pre-load of the driving spring. The spring pre-load can be set to a desired amount very easily by means of the pre-loading screw. However, because the force of the driving spring alone is generally not sufficient to exert a desired pressure on the joint ball, this force is increased by the transmission, which in particular is designed as a transmission having a high transmission ratio. The high transmission ratio is preferably achieved in that the curved or spiral ball tracks have a pitch of approx. 0.4 mm per turn. The first transmission part is preferably designed as a steel ring. Furthermore, the ball tracks are preferably designed as curved or spiral ball running grooves. The first transmission part preferably has the groove for the bearing balls on the side of the first transmission part facing the first ball socket part. The groove is designed circular and with constant depth in particular, wherein the bearing balls of the axial ball bearing preferably run in the groove. The efficiency of the transmission is high due to the ball support of the first transmission part on both sides. Furthermore, the mechanical advantage of the transmission is high due to the relatively low pitch of the curved or spiral ball tracks. Thus a very large axial force can be applied to the ball socket parts at high efficiency by means of a small pre-load force of the spiral spring. The transmission is preferably self-locking, so that axial compressive forces applied to the ball and socket joint from the outside can be supported.

Advantages of the ball and socket joint according to the invention consist in particular in the high efficiency of the adjusting device of the ball and socket joint, which adjusting device can additionally be designed relatively flat. If a driving spring is used, the ball and socket joint is furthermore self-adjusting in regard to the friction acting on the joint ball, so that flawless and constant functioning of the ball and socket joint can be ensured over the service life of the ball and socket joint. The friction can also be set by means of the pre-loading screw. Advantageously, the self-adjustment occurs automatically, i.e., without an external drive and without any controller that might be required therefor. The ball and socket joint according to the invention is therefore robust, compact, and economical.

By means of the ball and socket joint according to the invention, disadvantages of conventional ball and socket joints can be avoided, because the torque set by means of the pre-load of the bearing shell can be maintained over the service life of the ball and socket joint itself if the bearing shell wears over time. Furthermore, annealing is not required at the end of the production process of the ball and socket joint.

BRIEF DESCRIPTION OF THE DRAWINGS

The invention is described below using a preferred embodiment with reference to the drawing. In the drawing.

DETAILED DESCRIPTION OF THE PREFERRED EMBODIMENTS

Figure 1:
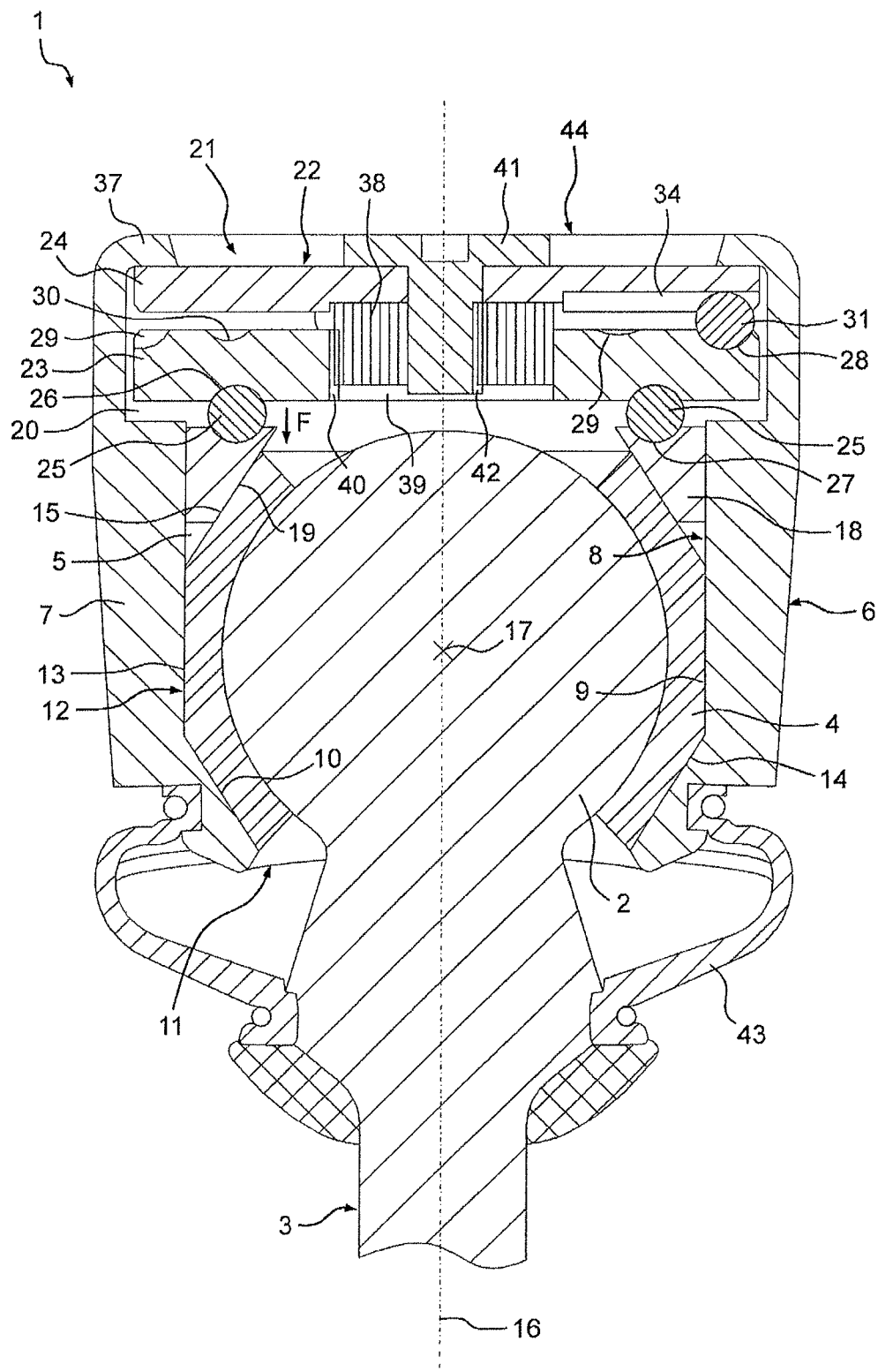
FIG. 1 shows a sectional view through a ball and socket joint according to an embodiment of the invention.

In FIG. 1, a longitudinal section through a ball and socket joint 1 according to an embodiment of the invention can be seen, wherein a ball pin 3 having a joint ball 2 is supported in a bearing shell 4 in a rotatable and pivotable manner by means of the joint ball 2 of the ball pin. The bearing shell 4 sits with the joint ball 2 in an interior 5 of a housing 6, which has a wall 7 that extends around a longitudinal axis 16 of the ball and socket joint 1 and that bounds the interior 5. The inner circumferential surface 8 of the wall 7 has a cylindrical region 9 and a conical region 10 connected to the cylindrical region. The conical region 10 is tapered in the longitudinal direction 16 with decreasing distance from a pin opening 11 of the housing 6 through which the ball pin 3 extends out of the housing 6. Furthermore, the outer circumferential surface 12 of the bearing shell 4 has a cylindrical region 13 and two conical regions 14 and 15, which are each connected to the cylindrical region 13 and are disposed on opposite sides of the center point 17 of the joint ball 2 in the direction of the longitudinal axis 16. The conical region 14 of the outer circumferential surface 12 of the bearing shell 4 rests against the conical region 10 of the inner circumferential surface 8 of the wall 7. The conical region 14 follows the conical region 10 and is tapered with decreasing distance from the pin opening 11. In contrast, the conical region 15 is tapered with increasing distance from the pin opening 11. In the housing 6, a ring 18 is disposed and is movably guided in the interior 5 in the direction of the longitudinal axis 16. The ring 18 has a conical inner circumferential surface 19, which rests against the conical region 15. The inner circumferential surface 19 follows the conical region 15 and is tapered with increasing distance from the pin opening 11. The ring 18 and the housing 6 together form a two-piece ball socket, which encloses the joint ball 2 and in which the joint ball 2 is supported, the bearing shell 4 being disposed therebetween. The ring 18 forms a first ball socket part, and the housing 6 forms a second ball socket part. The longitudinal axis 16 extends through the center point 17 of the joint ball 2 and at the same time defines an axial direction of the ball and socket joint 1.

The interior 5 has a cylindrical region 20 having a large diameter, in which an adjusting device 21 is disposed. The adjusting device 21 comprises a transmission 22, which has a first transmission part 23 and a second transmission part 24. The first transmission part 23 rests against the ring 18, bearing balls 25 being disposed therebetween in the axial direction, wherein the bearing balls 25 are guided in annular grooves 26 and 27 that extend around the longitudinal axis 16 and that have the same diameter. The groove 26 is introduced into the face of the first transmission part 23 facing the ring 18, and the groove 27 is introduced into the face of the ring 18 facing the first transmission part 23. Thus the first transmission part 23, the bearing balls 25, and the ring 18 together form an axial ball bearing, wherein the first transmission part 23 can be rotated about the longitudinal axis 16 relative to the ring 18.

Figure 2:
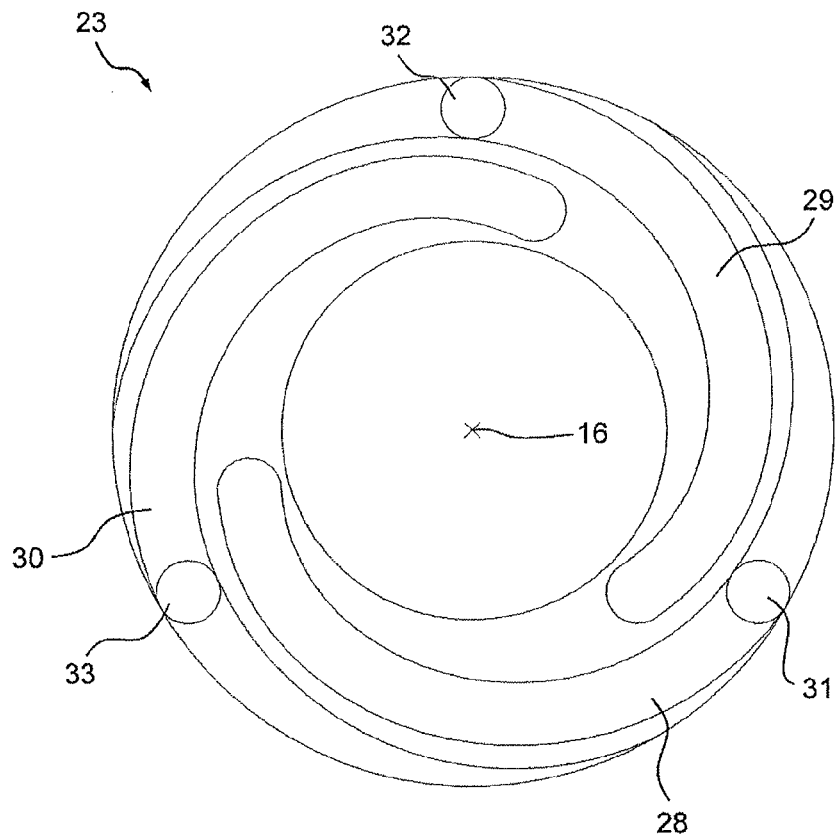
FIG. 2 shows a top view of the first ball socket part of the transmission that can be seen in FIG. 1.

Three grooves 28, 29, and 30 rising in the axial direction and extending around the longitudinal axis 16 in a spiral shape are introduced onto the face of the first transmission part 23 facing the second transmission part 24, in each of which grooves a transmission ball 31, 32, or 33 is guided, which can be seen in FIG. 2. Grooves 34, 35, and 36 extending radially with respect to the longitudinal axis 16 are introduced into the face of the second transmission part 24 facing the first transmission part 23, in which grooves the transmission balls 31, 32, and 33 are radially guided, which can be seen in FIG. 3. The grooves 28, 29, 30, 34, 35, and 36 form ball tracks for the transmission balls 31, 32, and 33, wherein the ball tracks 28 and 34 form a first ball track pair, which encloses the transmission ball 31. Furthermore, the ball tracks 29 and 35 form a second ball track pair, which encloses the transmission ball 32. Finally, the ball tracks 30 and 36 form a third ball track pair, which encloses the transmission ball 33. The transmission parts 23 and 24 thus rest against each other in the axial direction, the transmission balls 31, 32, and 33 being disposed therebetween.

The second transmission part 24 is supported axially on the housing 6 at the face of the second transmission part facing away from the first transmission part 23 by an edge region 37 of the wall 7 bent radially inward. Thus the bearing shell 4 is also supported axially on the housing 6 by means of the ring 18, the bearing balls 25, and the transmission 22. In the opposite direction, the bearing shell 4 is supported axially on the housing 6 by means of the conical region 10. Thus the bearing shell 4 is axially secured in the housing 6 on both sides. Furthermore, the second transmission part 24 is connected to the housing 6 in a rotationally rigid manner.

The adjusting device 21 comprises a drive in the form of a pre-loaded spiral spring 38, which sits in a space 39 bounded by the annular first transmission part 23. A slit 40, in which the radially outer end of the spiral spring 38 engages and thus is fastened to the first transmission part 23, is provided on the inner circumferential surface of the first transmission part 23 that bounds the space 39. The spiral spring 39 is pushed onto a screw 41 in the axial direction, the screw being screwed into the second transmission part 34 and having a slit 42 in the outer circumferential surface of the screw, in which slit the radially inner end of the spiral spring 38 engages and thus is fastened to the screw 41. The pre-loaded spiral spring 38 applies a torque to the first transmission part 23, which is rotatably supported in the housing 6 about the longitudinal axis 16. The torque forces the first transmission part 23 to rotate about the longitudinal axis 16, which thus forms a rotational axis. The torque, in interaction with the ball tracks 28, 29, and 30 that rise in the longitudinal direction 16, causes the ring 18 to be pressed against the bearing shell 4 in the longitudinal direction 16. The axial force applied to the ring 18 by the transmission balls 31, 32, and 33 is indicated schematically and identified with the letter F.

The ring 18 presses the bearing shell 4 against the conical region 10 in the direction of the longitudinal axis 16, so that the bearing shell 4 is axially clamped between the ring 18 and the housing 6. The bearing shell 4 is made of a material that deforms elastically under the effect of force. If the bearing shell 4 wears due to long use, an undesirable play between the joint ball 2 and the bearing shell 4 therefore can be prevented, because the ring 18 deforms the bearing shell 4 and presses the bearing shell against the joint ball 2. This functions as long as the spiral spring 38 is under adequate stress. The stress of the spiral spring 38 can be set by rotating the screw 41, for which reason the screw is also referred to as a pre-loading screw. Because the pressure exerted on the bearing shell 4 by means of the ring 18 is transferred at least partially to the joint ball 2, the friction between the joint ball 2 and the bearing shell 4 can also be set by means of the pre-load of the spiral spring 38.

The pin opening 11 is sealed by means of a bellows seal 43, which rests against the housing 6 on one side and against the ball pin 3 on the other side in the axial direction, the ball pin extending through the bellows seal 43. The bellows seal 43 prevents dirt and moisture from entering the inside of the housing 6. Furthermore, it is possible to seal the housing opening 44 opposite the pin opening 11 in the longitudinal direction 16, for example by means of a cap.

Figure 3:
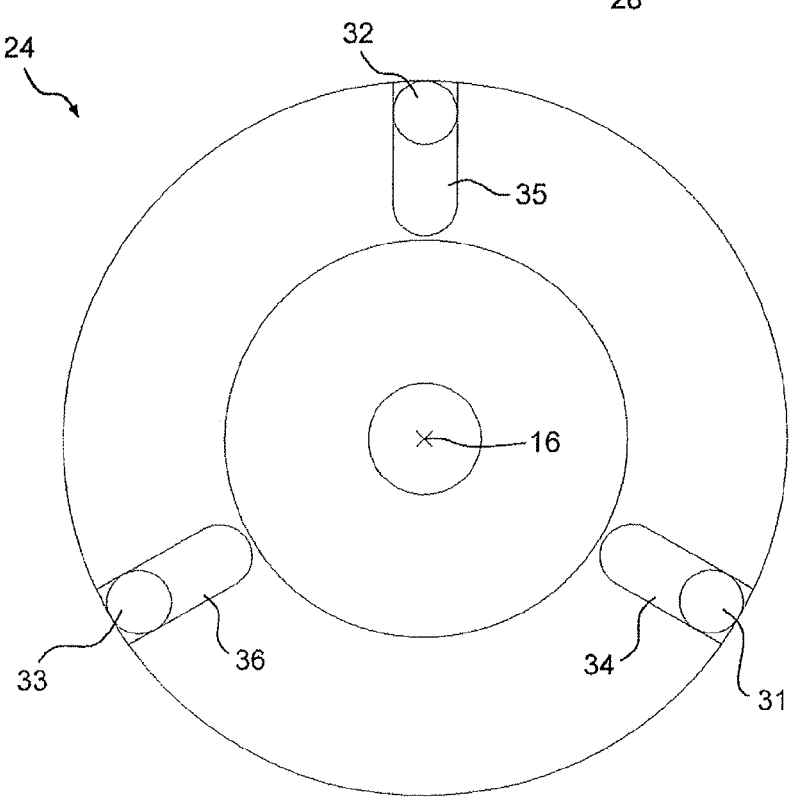
FIG. 3 shows a top view of the second ball socket part of the transmission that can be seen in FIG. 1.

FIG. 2 shows a top view of the transmission part 23 in the direction of the arrow F, wherein the bearing balls 31, 32, and 33 lie in the spiral ball tracks 28, 29, and 30. FIG. 3 shows a top view of the transmission part 24 in the opposite direction of the arrow F, wherein the bearing balls 31, 32, and 33 lie in the ball tracks 34, 35, and 36.

REFERENCE CHARACTERS

1 Ball joint
2 Joint ball of the ball pin
3 Ball pin
4 Bearing shell
5 Interior of the housing
6 Housing, second ball socket part
7 Wall of the housing
8 Inner circumferential surface of the wall
9 Cylindrical region of the inner circumferential surface
10 Conical region of the inner circumferential surface
11 Pin opening of the housing
12 Outer circumferential surface of the bearing shell
13 Cylindrical region of the outer circumferential surface
14 Conical region of the outer circumferential surface
15 Conical region of the outer circumferential surface
16 Longitudinal axis of the ball and socket joint, axial direction
17 Center point of the joint ball
18 Ring, first ball socket part
19 Inner circumferential surface of the ring
20 Region of the interior
21 Adjusting device
22 Transmission of the adjusting device
23 First transmission part
24 Second transmission part
25 Bearing ball
26 Annular groove
27 Annular groove
28 Ball track
29 Ball track
30 Ball track
31 Transmission ball
32 Transmission ball
33 Transmission ball
34 Ball track
35 Ball track
36 Ball track
37 Bent edge of the wall
38 Spiral spring, drive of the adjusting device
39 Space in the first transmission part
40 Slit in the first transmission part
41 Pre-loading screw
42 Slit in the pre-loading screw
43 Bellows seal
44 Housing opening
F Force

The invention claimed is:

1. A ball and socket joint for a vehicle, the ball and socket joint comprising:
   a ball pin (3) comprising a joint ball (2),
   a ball socket enclosing the joint ball (2) and being provided with a pin opening (11) in which the joint ball (2) of the ball pin (3) being rotatably supported, and the ball pin extending out of the ball socket through the pin opening (11),
   the ball socket comprising first and second ball socket parts (18, 6), the second ball socket part having an inner circumferential surface which slidably supports the first ball socket part such that the first and the second ball socket parts are movable relative to one another in an axial direction, the inner circumferential surface of the second ball socket part has a conical region that acts on one side of the joint ball (2) that is axially opposite another side of the joint ball on which the first ball socket part acts,
   an adjusting device (21) comprising a transmission (22) having first and second transmission parts, and a pre-loaded spiral spring having a first end that is coupled to the first transmission part and a second end that is coupled to the second transmission part,
   the first transmission part (23) having ball tracks (28, 29, 30) which rise in the axial direction and extend curved around a rotational axis oriented in the axial direction and in each of which a transmission ball (31, 32, 33) is movably guided, and the second transmission part (24) contacts the transmission balls (31, 32, 33), which are disposed between the first and the second transmission parts (23, 24) in the axial direction, the second transmission part is axially fixed relative to the second ball socket part, and the first transmission part is axially fixed and rotatable relative to the first ball socket part, and the transmission balls (31, 32, 33) and the first transmission part (23) being rotatable relative to one another about the rotational axis (16) by the spiral spring such that the first and the second ball socket parts exert an axial pressure on the joint ball.

2. The ball and socket joint according to claim 1, wherein the ball tracks (28, 29, 30) of the first transmission part (23) extend in a spiral fashion around the rotational axis (16).

3. The ball and socket joint according to claim 1, wherein the second ball socket part (6) forms a housing in which the joint ball (2), the first ball socket part (18) and the transmission (22) are disposed.

4. The ball and socket joint according to claim 1, wherein the second transmission part (24) contacts the transmission balls (31, 32, 33) at points that lie in a plane extending perpendicularly to the axial direction.

5. The ball and socket joint according to claim 1, wherein the second transmission part (24) comprises other ball tracks (34, 35, 36), in which the transmission balls (31, 32, 33) are movably guided.

6. The ball and socket joint according to claim 5, wherein the radial guides are formed by the ball tracks (34, 35, 36) of the second transmission part (34).

7. The ball and socket joint according to claim 1, further comprising extending guides, in which the transmission balls (31, 32, 33) are each movably guided in a radial direction, the guides and the first transmission part (23) are rotatable relative to each other about the rotational axis (16) by the spiral spring.

8. The ball and socket joint according to claim 1, wherein the first transmission part (23) is rotatable about the rotational axis (16) relative to the transmission balls (31, 32, 33) by the spiral spring.

9. The ball and socket joint according to claim 1, wherein the first transmission part (23) is coupled, via bearing balls, to the first ball socket part (18), the bearing balls (25) are disposed between the first transmission part (23) and the first ball socket part (18) in the axial direction.

10. The ball and socket joint according to claim 1, wherein the second end of the spiral spring is fastened to a screw (41) that is screwed into the second transmission part (24).

11. The ball and socket joint according to claim 1, wherein the joint ball (2) is supported in the ball socket, and a bearing shell (4) is disposed therebetween.

* * * * *